United States Patent
Clements

(10) Patent No.: US 10,528,964 B1
(45) Date of Patent: Jan. 7, 2020

(54) DESIGNATED USER MANAGEMENT AND VALUE TRANSFER

(71) Applicant: Douglas Logan Darrow Clements, Winnetka, CA (US)

(72) Inventor: Douglas Logan Darrow Clements, Winnetka, CA (US)

( * ) Notice: Subject to any disclaimer, the term of this patent is extended or adjusted under 35 U.S.C. 154(b) by 0 days.

(21) Appl. No.: 16/181,018

(22) Filed: Nov. 5, 2018

(51) Int. Cl.
*G06Q 30/02* (2012.01)
*H04L 29/08* (2006.01)
*G06F 3/0481* (2013.01)

(52) U.S. Cl.
CPC ......... *G06Q 30/0214* (2013.01); *H04L 67/16* (2013.01); *G06F 3/0481* (2013.01); *G06Q 30/0277* (2013.01)

(58) Field of Classification Search
CPC .................................................. G06Q 30/0214
See application file for complete search history.

(56) References Cited

U.S. PATENT DOCUMENTS

| | | | | |
|---|---|---|---|---|
| 6,345,261 B1 * | 2/2002 | Feidelson | ............ | G06Q 20/387 705/14.18 |
| 2011/0320250 A1 * | 12/2011 | Gemmell | ............... | G06Q 30/02 705/14.16 |
| 2013/0080549 A1 * | 3/2013 | Watanabe | ............ | G06Q 10/107 709/206 |
| 2014/0164087 A1 * | 6/2014 | Sun | ........................ | G06Q 50/01 705/14.25 |

OTHER PUBLICATIONS

Sophia Bernazzani, Customer Loyalty: The Ultimate Guide https://blog.hubspot.com/service/customer-loyalty/, Nov. 6, 2018, 24 pages.
Which are the Top 5 Altcoins for Incentives—Rewards—Gamification?, https://www.kryptographe.com/top-5-altcoins-incentives-rewards-gamification, Nov. 6, 2018, 13 pages.
Aaron Ordendorff, "Loyalty Program Examples: 25 Strategies & 100+ Stats from Ecommerce & Retail", https://www.shopify.com/enterprise/loyalty-programs, Aug. 16, 2018, 45 pages.
Thorin Klosowski, "A Beginner's Guide to Airline Miles" https://lifehacker.com/a-beginners-guide-to-airline-miles-1592887319, Jun. 19, 2014, 12 pages.

* cited by examiner

*Primary Examiner* — Peter H Choi
*Assistant Examiner* — Derek Jessen
(74) *Attorney, Agent, or Firm* — Schwegman Lundberg & Woessner, P.A.

(57) ABSTRACT

Techniques are described for tracking users of a service, and identifying designated users based on various criteria. Criteria for identifying designated users can include whether the users registered for the service prior to a deadline, and/or whether the users are among the first predetermined number of users to register. Designated users can also be identified based on activities performed by users through the service. Value, such as at least a portion of a share in an entity associated with the service, can be transferred to each of the designated users (e.g., through a network transfer) based on the evaluation of parameters such as whether the number of designated users reaches a predetermined threshold number, and/or whether the number of designated users reaches the predetermined threshold number no later than a predetermined deadline.

19 Claims, 6 Drawing Sheets ent disclosure are set forth in the accompanying drawings and the description below. Other features and advantages of the present disclosure will be apparent from the description and drawings, and from the claims.

DESIGNATED USER MANAGEMENT AND VALUE TRANSFER

BACKGROUND

A large number of services are available to users on the Internet, including social media platforms, e-commerce sites, news and commentary services, online gaming platforms, and others. Also, many services that exist primarily separately from the Internet, such as so-called brick-and-mortar businesses, have established a presence on the Internet to sell goods and services online, advertise their goods and services, and otherwise connect with existing and potential customers. In both examples, attracting new users to register with or otherwise use a service can be crucial to the success of the service. Moreover, the value of various types of services may be determined, at least in part, by a network effect whereby the value of the service increases (e.g., linearly or in some instances exponentially) as the service attracts and maintains a larger user population. Accordingly, services seek new ways to build their user base and thus survive and grow.

SUMMARY

Implementations of the present disclosure are generally directed to tracking and rewarding users of a service, such as an online, Internet-based, computer-implemented service. More particularly, implementations of the present disclosure are directed to monitoring the number of users who have registered with a service, determining which of the users are designated users based on various criteria, determining if the number of designated users reaches a predetermined threshold (e.g., before a predetermined deadline time/date), and transferring value such as a grant of shares to each of the designated users.

In general, implementations of innovative aspects of the subject matter described in this specification can be embodied in a method that includes the following operations: accessing registration data that identifies registered users of a service; analyzing the registration data to determine a number of designated users of the service, wherein a user is determined to be a designated user based at least partly on the user having registered with the service no later than a time when a number of designated users of the service reaches a predetermined target parameter; and based at least partly on the number of designated users being at least the target parameter, sending a network communication to initiate, to each of the designated users, a transfer of a value that includes at least a portion of a share in an entity that is associated with the service.

Implementations of innovative aspects of the subject matter described in this specification can be embodied in a method that includes the following operations: accessing registration data that identifies registered users of a service; analyzing the registration data to determine a number of designated users of the service, wherein a user is determined to be a designated user based at least partly on the user having registered with the service prior to a predetermined deadline; and sending a network communication to initiate, to each of the designated users, a transfer of a value that includes at least a portion of a share in an entity.

These and other implementations can each optionally include one or more of the following innovative aspects: the user is determined to be a designated user further based on the user having registered with the service prior to a predetermined deadline; the grant is transferred to each of the designated users based on a determination that the service reached the target parameter of designated users no later than the deadline; the operations further include presenting, in a user interface (UI) of the service, the deadline; the user is determined to be a designated user further based on a user score for the user being at least a threshold score, the user score calculated based on detecting one or more activities performed by the user through the service; the one or more activities include one or more of uploading content to the service, creating content on the service, sending at least one message through the service, initiating at least one transaction through the service, interacting with at least one advertisement through the service, inviting at least one other user to register with the service, inviting at least one other user to register for the service who registers and becomes another designated user, communicating with at least one other user through the service, subscribing to the service, interacting with at least one other user through the service, and using the service for at least one activity; at least two of the activities are weighted differently in calculating the user score; an amount of shares included in the grant to a designated user is based on the user score for the designated user; the operations further include presenting, in a UI of the service, a current user score for one or more of the designated users; the user score is calculated further based on detecting one or more other activities performed by the user through at least one other service; the user is determined to be a designated user further based on the user being in a top-ranked predetermined number of users ranked according to the user score; the operations further include presenting, in a user interface (UI) of the service, a current number of designated users of the service; and/or the entity associated with the service.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
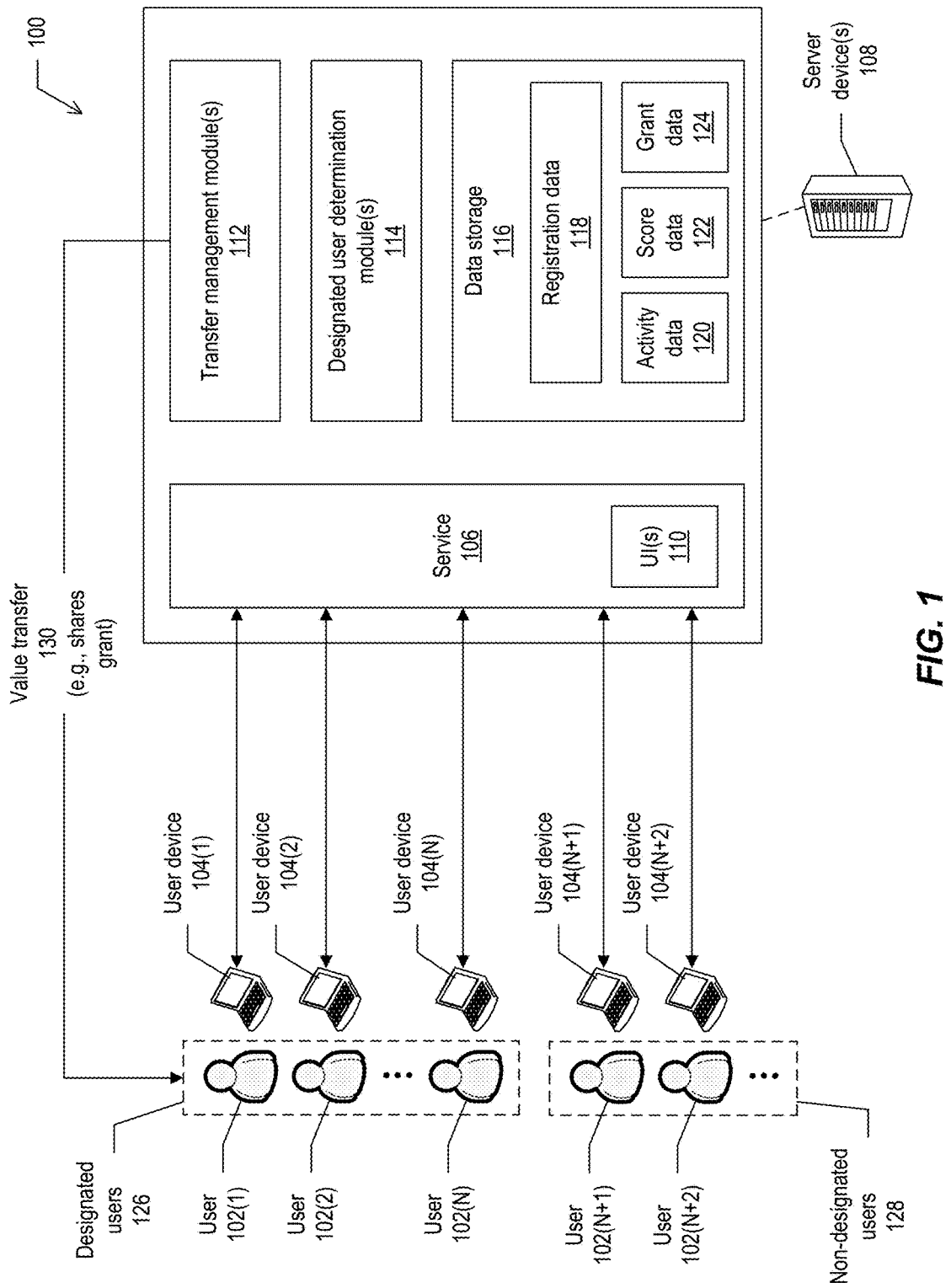
FIG. 1 depicts an example environment, according to implementations of the present disclosure.

Implementations of the present disclosure are directed to techniques for tracking users of a service, identifying designated users based on various criteria, and transferring value to each of the designated users based on the evaluation of certain parameters, such as whether the number of designated users reaches a predetermined threshold number, and/or whether the number of designated users reaches the predetermined threshold number no later than a predetermined deadline (e.g., date and/or time).

Implementations provide a platform and/or mechanism to incentivize users to register with and/or actively participate in a service, such as an online service that is provided through the Internet, by providing designated users with some value if a certain predetermined threshold number of users become registered with the service and/or if other criteria are satisfied. In some implementations, the value transferred is a grant of an amount of shares of stock in an entity (e.g., a corporation) that operates or is otherwise associated with the service being offered. For example, the first million users to register as members of a newly launched social network site can be awarded with a grant of a certain number of shares of stock in the entity that owns or operates the social network site, if a threshold number of registered users (e.g., one million) is reached prior to a predetermined threshold deadline (e.g., date and/or time). In some examples, designated users can also be identified based on their activities through the service, particularly activities that contribute value to the service in some (e.g., quantifiable) way. For example, designated users can be determined based on those users who post content to a site (e.g., comments, blog posts, product reviews, media content, etc.), purchase products through the site, click on advertisements on the site, invite other users to join the site, and so forth. In some implementations, a user score can be calculated for a registered user based on their various activities, and users with a score that exceeds a threshold score may be designated as designated users to receive the shares grant or other value.

Accordingly, implementations provide a data-processing platform that operates to identify designated users based on various factors, such as whether the users registered with the service prior to the time when a threshold number of designated users (referred to herein as the stocking number), and/or prior to the expiration of a predetermined deadline (referred to herein as the stocking deadline). Designated users can be eligible to receive the transferred value (e.g., shares grant). In some examples, the value is transferred to the designated users if the stocking number of designated users is reached before the stocking deadline expires. Moreover, in some implementations, users are identified as designated users because they engaged in desirable value-adding activities through the service, such as the uploading of content, inviting or referring new users to register, purchasing products, viewing advertisements, sending messages through the service, and/or other activities that may contribute to the overall value of the service. Such activities may be detected, e.g., prior to the expiration of the stocking deadline, and used to calculate a score for each user. Users whose scores exceed a predetermined threshold can be identified as designated users. In this way, implementations provide a mechanism by which valuable, desirable users are more incentivized to register and actively engage with the service, and users that do register are incentivized to engage in highly desirable activities.

Implementations support the use of any suitable type of value that may be transferred to designated users to incentivize their registration with the service and/or incentivize the users to perform the value-adding (e.g., desirable) activities through the service and/or elsewhere. In some implementations, the value is a grant of one or more shares (e.g., stock shares), or at least a portion of at least one share, in an entity that owns or is otherwise associated with the service. For example, an increased user count and/or increase in the number of particularly value-adding users may serve to increase the value of the service and of the entity that operates the service. Accordingly, a grant of shares to the users enables participating users to directly benefit from the increased value of the service, which the users themselves contributed to. Providing the transfer of value to designated users enables a service to achieve a desired network effect by rapidly growing their number of users and/or incentivizing the participation of value-adding users.

In some implementations, users are vetted during the registration process to ensure that the registered users of the service satisfy various criteria. Such criteria may include, but are not limited to, allowing the registration of users who are: at least a minimum age (e.g., 18 years old), reside in one of a particular set of designated areas (e.g., countries, states, cities, provinces, prefectures, etc.), a citizen of one of a particular set of designated countries. Registration may also be limited to users who can produce a verifiable credential, such as an image of a valid, non-expired, government-issued identification credential (e.g., passport, driver license, etc.). The registration process may also employ any suitable technique to ensure a single registration per user and to ensure that users are actual humans and not automated processes (e.g., bots), to prevent fraud and abuse.

From among a population of registered users of a service, designated users can be identified based on one or more of the following criteria:

The user having registered with the service prior to the service registering the predetermined stocking number of users (e.g., one million).

The user having registered with the service prior to the expiration of the predetermined stocking deadline. The stocking deadline can be a particular date, a particular time, or a particular time on a particular date, with date and time described using any suitable format. Expiration of a deadline, as described herein, indicates that the date and/or time has passed beyond the date and/or time designated as the deadline.

The user having a user score that is at least a predetermined threshold score. The user score for a user can be calculated based on the detection of designated (e.g., value-adding) activities that the user engages in through the service. Such activities can include, but are not limited to, one or more of the following: adding content to the service, such as uploading images, video, audio, graphics, and/or other media content, posting comments, posting reviews, posting articles, and so forth; inviting, referring, or otherwise contributing to other users registering for the service; creating such content on the service, such as composing a review, blog post, and/or other content within the service; viewing advertisements and/or other designated content through the service; initiating at least one transaction through the service, such as buying product(s) or service(s) offered for sale through the service, and/or selling (or offering to sell) product(s) or service(s) through the service; and/or sending messages through the service. The activities can also include another other type of activity that is performed by the user through the service. For example, the activities can include a user initiating a subscription to the service, such as a subscription that charges a periodic (e.g., monthly) fee.

In some examples, the score can be calculated based on the activities that the user performed prior to the expiration of the stocking deadline. In some implementations, the user score can also be based on activities performed by the user through other services (e.g., using other web sites, apps, and so forth) that are designated for tracking user activity using pixels, beacons, cookies, or other suitable techniques. In some implementations, different activities are weighted differently (e.g., awarded different point values) in calculating the score for a user. For example, the referral of other users to the service may be weighted more heavily in the calculation than the viewing of an advertisement or commenting on a blog post. As another example, posting a link to a video might be allocated more weight than posting a link to an article, and attracting a new designated user might be allocated more weight than posting a video. The service may inform the users of the weights allocated for various activities, to incentivize the more value-adding activities more heavily. The service may also notify users of their current scores and the scores they would need to achieve to become designated users prior to the expiration of the stocking deadline. Such notifications can be made to users through a user interface (UI) of the service, a message sent to the service to the users, and/or other suitable mechanisms.

In some examples, a higher score may be granted for a referral that leads to a successful registration of a designated user and even higher score for a referral that leads to the successful registration of a highly-desirable user (e.g., contributing more than a threshold number of activities). Such rule(s) may be applied to avoid and/or not incentivize referrals that do not lead to value being added to the service, and/or referrals that result is inactive or dormant user registrations. For example, a user may be given points toward their score based on one or more of the following considerations:

If the referrals register. For example, no points may be given just for referring, unless the referrals register.

If the referrals become designated users and not just registered users.

If the referrals become designated users based on exceeding a fixed score.

If the referrals become designated users based on a dynamic (rising) score with a "top one million users on the leader board". This may be applied given that some users may go in and out of this top group until the deadline is reached.

For users who refer others called referring user, and users who are referred called referred users, a referring user may not receive points if their referred user is a bot, a fraudster, opens multiple accounts, and/or otherwise engages in suspicious behavior. In some instances, if referring users are bots/fraudsters/multiple account holders but their referred users are legitimate, the referring users may be disqualified but the referred users may be allowed to participate and attempt to become designated users.

In some implementations, designated users are identified as those users who are ranked in the top N users according to the user scores. For example, the top one million users ranked according to score may be designated as designated users to receive the value transfer. In such instances, implementations may calculate, e.g., dynamically and/or in real time, the scores of the users, which are updated based on the latest activities of the users. The users may be periodically notified of their ranking and/or whether they are designated users or not, to incentivize the users to continue engaging in the scored activities and/or increase their activities to achieve and maintain a ranking to be a designated user.

When a new service is started it may be difficult for the service to acquire a large number of users and/or to acquire a large number of desirable, value-adding users. Traditionally, services have used previously available techniques such as free trials, discount prices, and expensive advertising. However, on the Internet where many services are already offered for free (e.g., social media, news media, video hosting, email, etc.), these traditional techniques may not be effective. Moreover, in some instances it may be difficult for a new service to acquire users while trying to compete with a preexisting, established service that is already serving these users. Implementations described herein provide a mechanism to incentivize users to register for a service, by providing value such as an ownership and/or equity stake in the entity that operates the service.

FIG. 1 depicts an example environment 100, according to implementations of the present disclosure. As shown in this example, the environment 100 can include one or more user devices 104 each operated by or otherwise associated with a user 102. A user device 104 can include any suitable type of computing device, including portable computing devices (e.g., smartphones, tablet computers, wearable computers, etc.) as well as less portable types of computing devices (e.g., desktop computers, laptop computers, smart appliances, gaming or entertainment consoles, etc.). The environment 100 can also include one or more server devices 108 that host and/or operate a service 106. The server device(s) 108 can include any suitable number and type of computing device, and can include distributed computing (e.g., cloud computing) server(s). The user device(s) 104 can communicate with the service 106 over one or more networks such as the Internet.

The service 106 can be any suitable type of service 106, including but not limited to an e-commerce site, a social network platform, a gaming platform, a news and/or commentary site, and so forth. The service 106 may be implemented using any suitable technology. For example, the service 106 can be a web site that is served by web servers, with content provided by application servers accessing persistence layer databases, middleware software, and/or other components. Such a web site can include any number of pages that are presented through a web browser and/or other suitable container for web content executing on the user device(s) 104. In some implementations, the service can be provided through some other type of application executing on the user device(s) 104, such as a native application or app. In some examples, the information presented through the application can be communicated to the user device(s) 104 from the service 106. The service 106 can include any suitable number and type of UI(s) 110 that present information to the user(s) 102.

The server device(s) 108 can also execute one or more transfer management module(s) 112, and/or one or more designated user determination module(s) 114. The server device(s) 108 can also include data storage 116. The module(s) 112, module(s) 114, and data storage 116 can collectively be described as the platform. The platform may interact with the service 106 to: 1) identify designated users of the service, 2) identify conditions in which the value transfer is to be made (e.g., satisfying the stocking number of designated users prior to expiration of a stocking deadline), and 3) initiate the transfer of the value to the designated users at the appropriate time (e.g., upon expiration of the stocking deadline or at some other date/time), such as initiating a transfer of a grant of a certain number of shares to each designated user.

The data storage 116 can store registration data 118 identifying registered users of the service 106, activity data 120 describing the activities (e.g., value-adding, desirable activities) of the users detected on the service 106, score data 122 describing (e.g., current) user scores for one or more users, and/or grant data 124 describing the value to be transferred (and/or that has been transferred) to the designated users. The data storage 116 can be part of the platform, hosted on the same server device(s) 108 as the module(s) 112 and/or 114, or can be external and hosted on other device(s) that are accessible over one or more networks. Although the platform is shown as in this example as being hosted on the same server device(s) 108 as the service 106, implementations are not so limited. In some implementations, the platform can be hosted separately from the service 106, on other device(s). In such examples, the platform can receive from the service 106, over one or more networks, information regarding registrations, activities, and/or other information regarding users of the service 106.

The module(s) 114 may analyze the registration data 118, the activity data 120, and/or other information to identify designated users 126 and/or non-designated users 128 as described herein. The module(s) 112 may initiate and/or otherwise manage the value transfer 130 to the designated users, such as the initiation of the shares grant to the designated users.

The value transferred to designated users can be of any suitable value, and may be determined to provide adequate incentive for user registration and/or activities on the service 106. For example, an entity that operates a service 106 may offer a substantial portion of its outstanding stock (e.g., 49%) as part of this program, with this amount divided among the identified designated users.

A designated user may be designated as a user who has satisfied all the qualifying criteria. In some implementations, the criteria include registering as one of the first N users (e.g., the stocking number) who register with the service. The criteria may also include registering before the expiration of the stocking deadline. The criteria may also include satisfying a minimum user score that is calculated based on the user's activities on the service and/or other service(s). In some examples, the criteria include being in the top M users ranked according to their user scores, to further incentivize users to add value to the service by engaging in valued-adding, scored activities.

If certain granting criteria are satisfying, each designated user can receive the transfer of value. Such granting criteria can include, but are not limited to, the stocking number of designated users being reached prior to expiration of the stocking deadline. The value transfer may be initiated at the stocking deadline, or at any suitable date/time following the expiration of the stocking deadline, if the granting criteria are satisfied.

For example, if two million new subscriptions (registrations) are made to the service (e.g., the target stocking level) before six months has passed (e.g., the stocking date), then the top one million highest scoring designated users, ranked as of the stocking date, can be granted stock shares in the company that owns the service. As another example, the top one million top-ranked users as of one year after the stocking deadline may be granted the shares. In this way, implementations can provide multiple motivational deadlines to fuel the growth of the user base and user activity. Users that join after the stocking level is reached may not receive the shares. Accordingly, implementations can notify users of the number of users who have become designated users periodically, and/or in real time, and may indicate to each user whether they became a designated user before or after the stocking level was reached and/or before or after the stocking deadline. In some examples, if the stocking deadline expires before the stocking level is reached then no users may receive the shares grant.

In some examples, the platform may provide each user with an up-to-date, real time indication of their user score and whether they in the top number of users qualifying for a shares grant, or if their score is not high enough to currently qualify. In the latter case, indicating the current score can incentivize the user to try and engage in more scored activities prior to the date at which the rankings are used to determine who is to receive the shares grant. Although examples herein describe the grant of shares, other types of value may be transferred to users who qualify.

In the various implementations, the determination of the stocking level (stocking number), stocking deadline, number or percent of shares offered, value to the service of the (e.g., desirable) activities, points earned for the activities, the size of the pool of top-ranked users to be rewarded, and/or other parameters may be adjusted to achieve the desired incentive, and to enable a service to rapidly increase their user base and activity levels. Implementations can be applied to increase the user (e.g., customer) base and/or activity level of an online service (e.g., web site, e-commerce portal, social network, etc.). Implementations can also be applied to increase the user (e.g., customer) base and/or activity level of other types of services whose presence and/or activities are not primarily on the Internet, such as any type of brick-and-mortar retail services. Implementations can be applied to services (e.g., businesses) that are starting and looking to quickly ramp up their number of users and/or user activity. Implementations can also be applied to services that are more mature, and are looking to expand further. Through the application of the implementations described herein, users can gain an equity share in the service, which can benefit both the service and the users.

Figure 2:
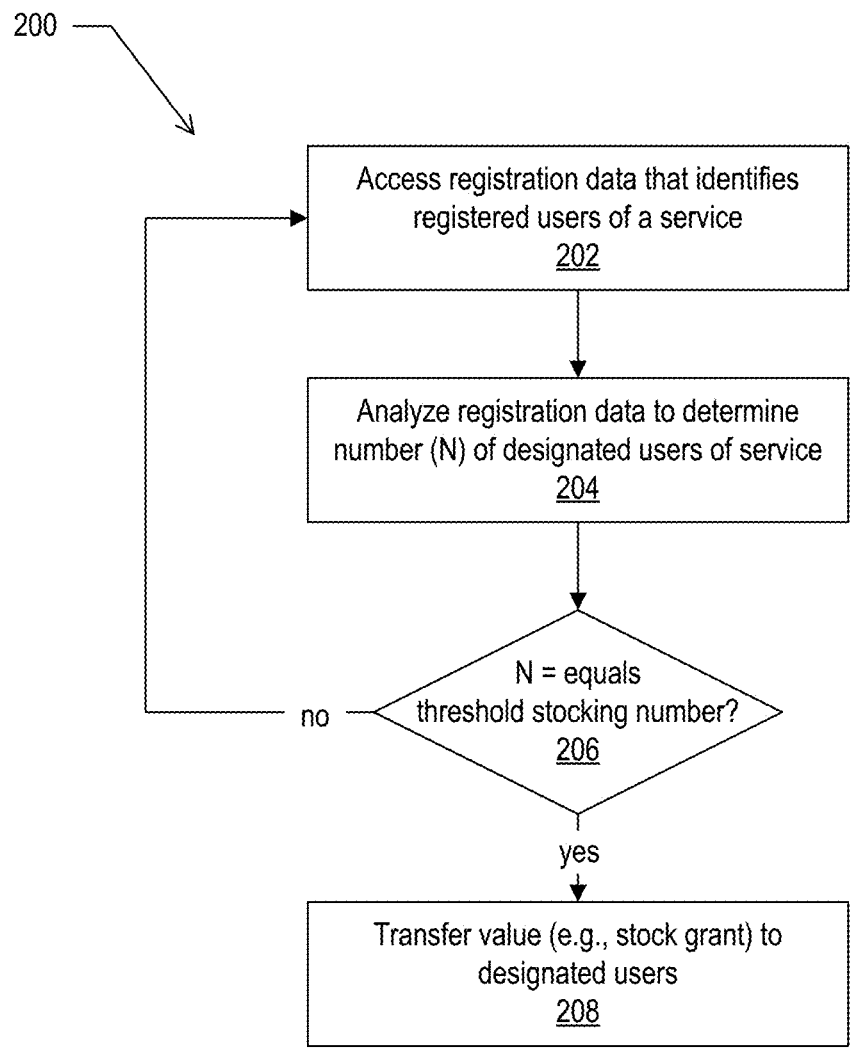
FIGS. 2-4 depict flow diagrams of example processes, according to implementations of the present disclosure.

FIG. 2 depicts a flow diagram 200 of an example process for managing the transfer of value to designated users, according to implementations of the present disclosure. Operations of the process can be performed by one or more of the designated user determination module(s) 114, the transfer management module(s) 112, the service 106, the UI(s) 110, and/or other software module(s) executing on the server device(s) 108 or elsewhere.

The registration data 118 can be accessed (202), the registration data 118 describing and/or identifying registered users of the service 106. As described above, registration can include checking to ensure that a new user satisfies requirements regarding minimum age, location, citizenship, and so forth, and may include filtering out bots, spamming processes, multiple registrations of the same user, potential fraudsters, and so forth.

The registration data 118 can be analyzed (204) to determine the current number N of designated users of the service 106. As described above, in some instances activity data 120 can also be employed to determine designated users based on their user scores.

A determination can be made (206) whether N is at least a target parameter (e.g., the threshold stocking number or stocking level).

If so, the value transfer (208) can be initiated to the designated users. If not, the process may continue monitoring for the target parameter to be reached. Initiating the transfer of value may include sending network communication(s) to initiate a transfer, to each designated user, of a value that includes at least one share in an entity that is associated with the service, such as an owner and/or operating company of the service.

Figure 3:
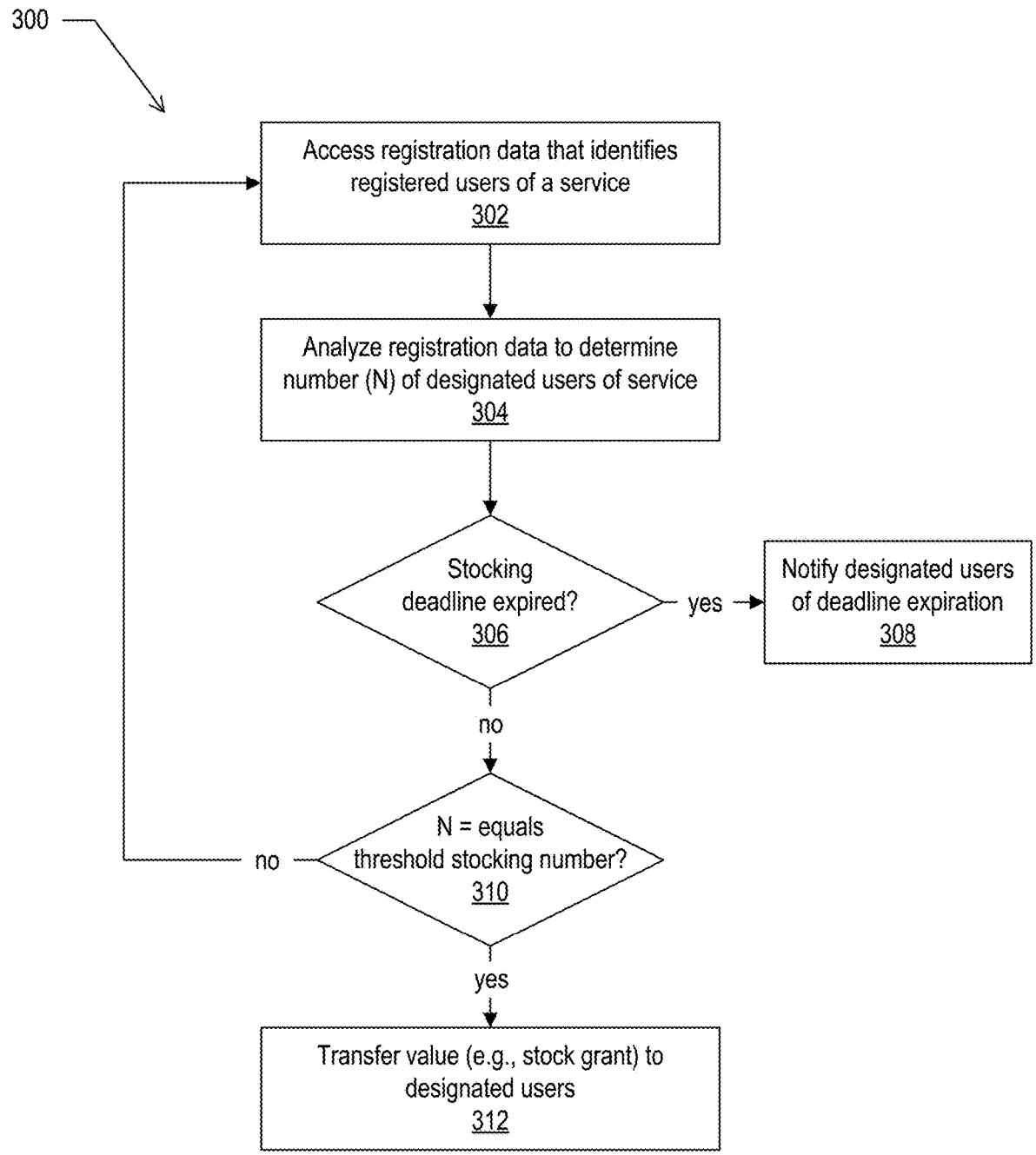

FIG. 3 depicts a flow diagram 300 of an example process for managing the transfer of value to designated users, according to implementations of the present disclosure. Operations of the process can be performed by one or more of the designated user determination module(s) 114, the transfer management module(s) 112, the service 106, the UI(s) 110, and/or other software module(s) executing on the server device(s) 108 or elsewhere.

The registration data 118 can be accessed (302), and analyzed (304) to determine the current number N of designated users of the service 106. As described above, in some instances activity data 120 can also be employed to determine designated users based on their user scores.

A determination can be made (306) whether the stocking deadline has expired. If so, designated users may be notified (308) of the deadline expiration, and/or that the value transfer may not occur. If the stocking deadline has not expired, a determination can be made (310) whether N is at least the target parameter (e.g., threshold stocking number or stocking level).

If so, the value transfer (312) can be initiated to the designated users. If not, the process may continue monitoring for the target parameter to be reached.

The processes of FIGS. 2 and/or 3 can be triggered periodically to check for the satisfaction of criteria that would trigger the value transfer. In some instances, the processes can be triggered by the registration of a new user.

Figure 4:
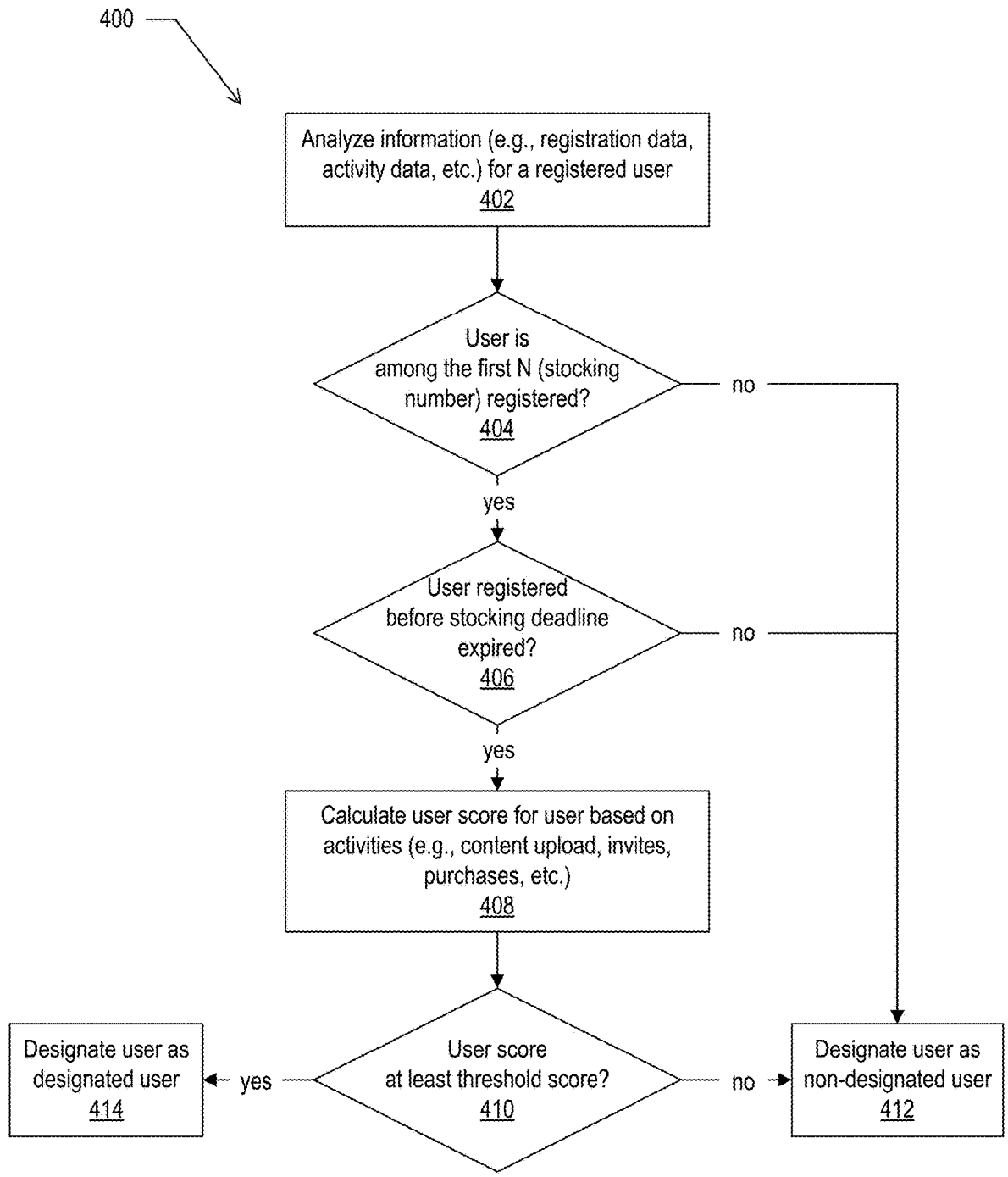

FIG. 4 depicts a flow diagram 400 of an example process for identifying designated users to receive a value transfer, according to implementations of the present disclosure. Operations of the process can be performed by one or more of the designated user determination module(s) 114, the transfer management module(s) 112, the service 106, the UI(s) 110, and/or other software module(s) executing on the server device(s) 108 or elsewhere.

Information for a particular registered user may be analyzed (402), including registration data 118 and/or activity data 120.

A determination may be made (404) whether the user is among the first N users (e.g., the target parameter) to be registered. If not, the user may be designated (412) as a non-designated user.

If so, a determination may be made (406) whether the user registered before the expiration of the stocking deadline. If not, the user may be designated (412) as a non-designated user.

If so, the user score for the user may be calculated (408) based on their activities, as described herein. A determination can be made (410) whether the user score is at least a threshold score. If not, the user may be designated (412) as a non-designated user. If so, the user may be designated (414) as a designated user.

Moreover, in some implementations, designated users may be designated as the top-ranked number of users (e.g., top million) according to their user scores. The criteria applied in this example, can be used individually or in any combination according to various implementations.

Figure 5:
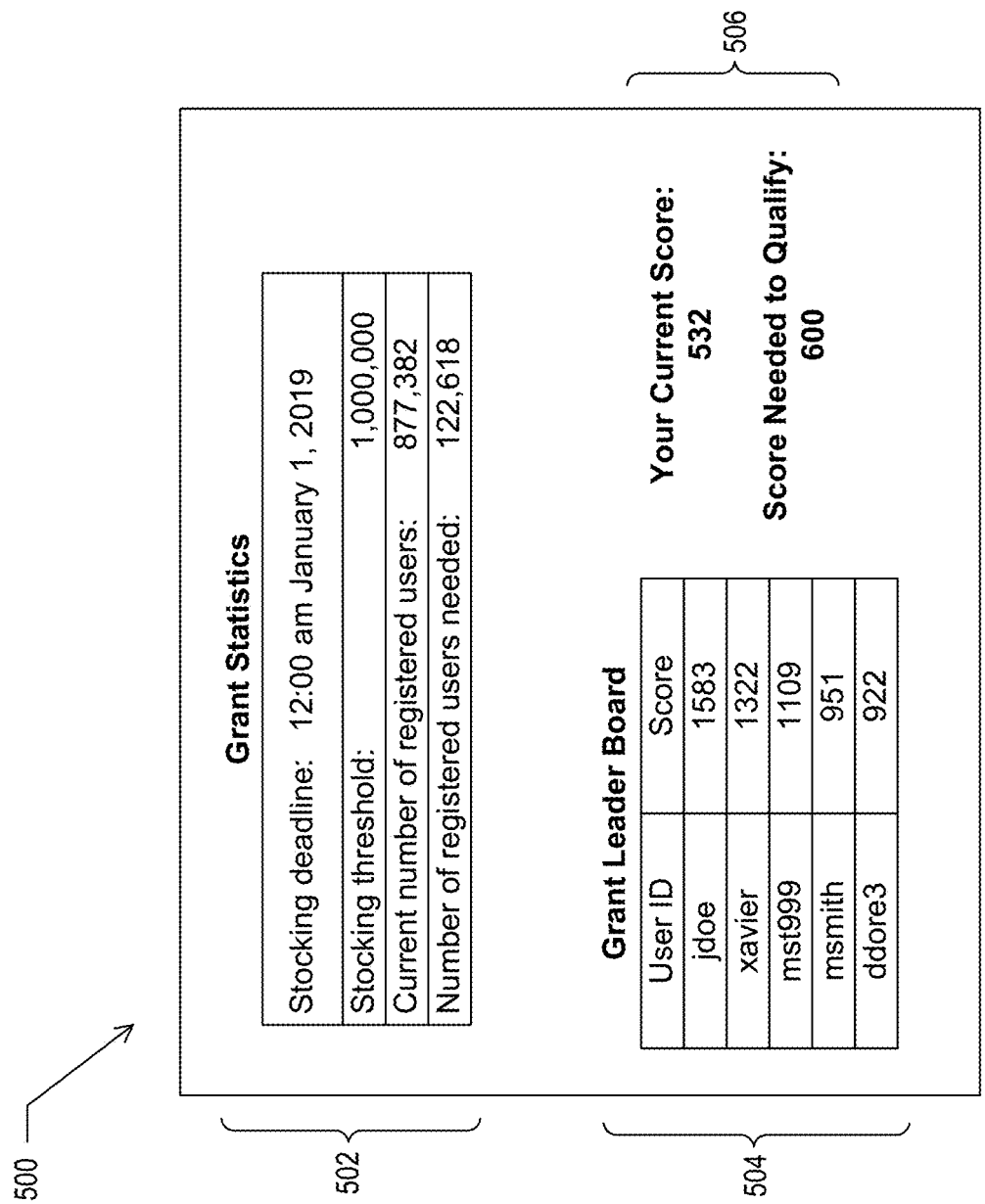
FIG. 5 depicts an example user interface, according to implementations of the present disclosure.

FIG. 5 depicts an example UI 500, according to implementations of the present disclosure. In some examples, the UI 500 may be presented as a part of the UI(s) 110 exposed by the service 106, as described above. Alternatively, the UI 500 may be presented separately and/or independently from the service UI(s) 110.

The UI 500 can include a section 502 that presents current grant statistics governing when and/or whether the value transfer may occur, such as the stocking deadline, the target parameter (threshold stocking number or stocking level) of designated users to be reached, a current number of designated users, and the number of designated users that are still needed to achieve the stocking threshold. The section 502 can also include other information such as the grant date (if different than the stocking deadline).

The UI 500 can include a section 504 that shows a current top-ranked number of users and/or their current scores (e.g., a leader board). A second 506 can present, to a currently logged on user of the service 106, their current score and the score they may need to achieve to be designated a designated user. In some examples, the current user's rank may be listed in the section 504 as well, to indicate how the user's score compares to that of other users.

The implementations described herein provide technical advantages and/or technical improvements over previously used systems. The implementations described herein provide for more efficient use of processing capacity, storage space, network bandwidth, active memory, and/or other computing resources, compared to previously used systems. In some implementations, the determination of whether a user is a designated user to receive value (e.g., shares) can be performed dynamically, in real time with respect to the generation and analysis of the registration data and/or activity data as described herein. Moreover, the value transfer to designated user(s) may be performed dynamically, in real time with respect to the determination that the one or more criteria have been satisfied to initiate the value transfer. As used herein, a real time operation may be performed in response to a triggering event, or in response to a triggering condition, without any intervening human activity being required. The real time operation may be performed in response to the triggering event, or in response to the detection of a triggering condition, within a short period of time (e.g., immediately), taking into account any latency in computer processing, network communications, data storage access, and/or other (e.g., unavoidable) delays that are inherent in the computing system performing the operations. Accordingly, a real time operation may be described as a synchronous operation with respect to the triggering event or triggering condition. In some examples, a real time operation may be performed in a same execution path as the detection of the triggering event or triggering condition. In some implementations, the value transfer is performed as a network communication (e.g., signal) that initiates the transfer to an account of each of the designated users. In some implementations, the value transfer includes sending a signal to a printing device and/or automatic mail system to print out a document indicating the value transfer and/or package that document in an envelope to be mailed to the designated user. The display of information through the UI(s) as described herein may be performed (e.g., in real time) with respect to the calculations performed to identify designated users and/or to determine whether criteria for initiating the value transfer have been satisfied. Accordingly, implementations described herein improve on previously available user interfaces and increase the operational efficiency of the computing devices described herein, by providing current, up-to-date information regarding the stocking threshold, the number of registered users, the number of registered users still needed to meet the stocking threshold, user scores, user rankings, and/or other information that is associated with the management of the value transfer described herein.

Figure 6:
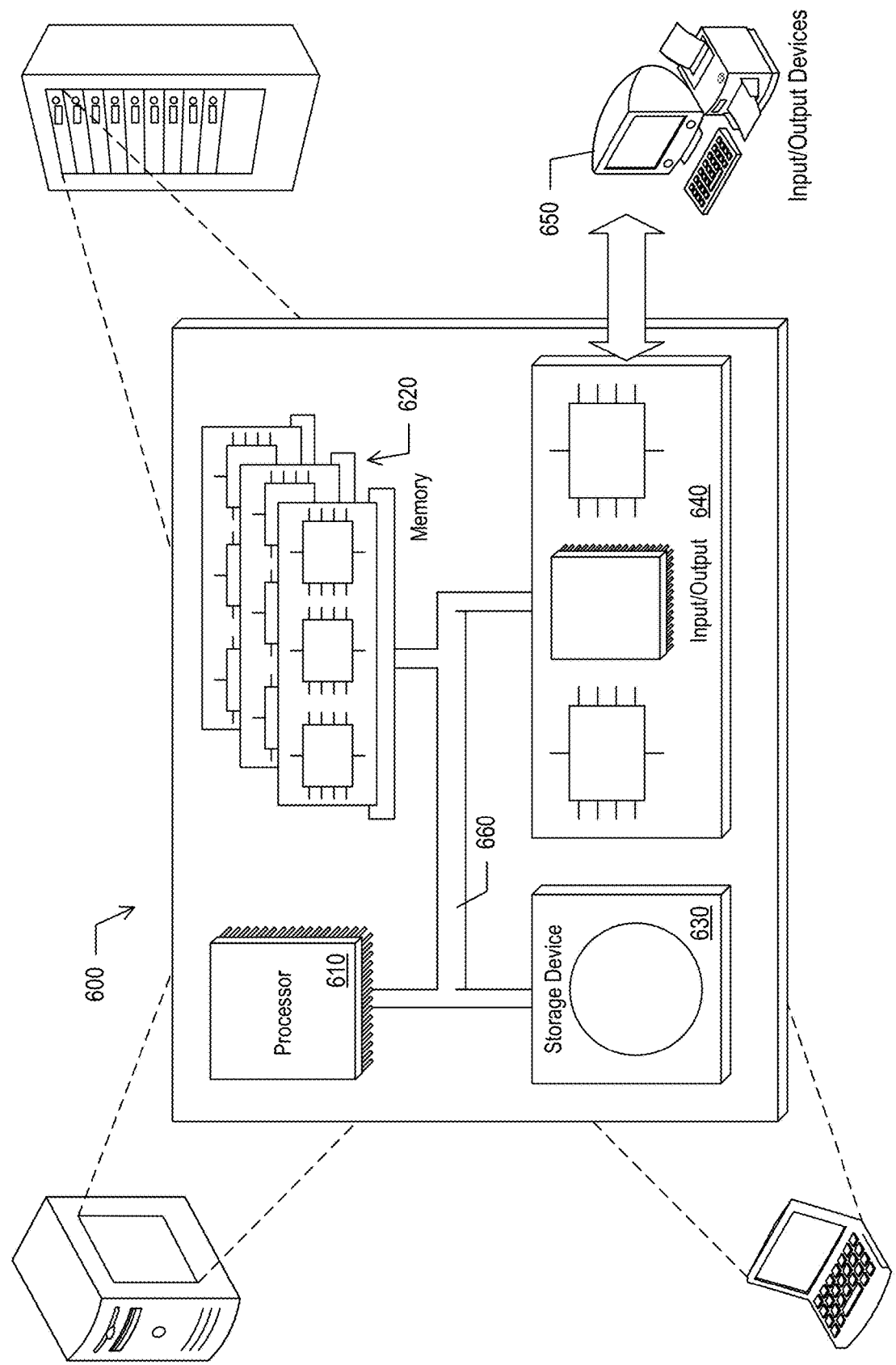
FIG. 6 depicts an example computing system, according to implementations of the present disclosure.

FIG. 6 depicts an example computing system, according to implementations of the present disclosure. The system 600 may be used for any of the operations described with respect to the various implementations discussed herein. For example, the system 600 may be included, at least in part, in one or more of the user device(s) 104, the server device(s) 108, and/or other computing device(s) or system(s) described herein. The system 600 may include one or more processors 610, a memory 620, one or more storage devices 630, and one or more input/output (I/O) devices 650 controllable via one or more I/O interfaces 640. The various components 610, 620, 630, 640, or 650 may be interconnected via at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. For example, the processor(s) 610 may execute instructions for the various software module(s) described herein. The processor(s) 610 may include hardware-based processor(s) each including one or more cores. The processor(s) 610 may include general purpose processor(s), special purpose processor(s), or both. In some examples, the computing systems described herein can be quantum computers.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, solid state device, an optical disk device, or a tape device. The storage device(s) 630 may include read-only memory, random access memory, or both. The storage device(s) 630 may include one or more of an internal hard drive, an external hard drive, or a removable drive. In some examples, the storage is distributed across multiple storage devices. For example a distributed ledger system and/or distributed ledger network of one or more blockchains can be employed to store information.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices such as a display, LED(s), an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the IEEE 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more communication networks using any network protocol.

Computing devices of the system 600 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, application, app, script, and/or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A computer-implemented method for causing a graphical user interface presented on a device of a registered user of a service to be updated dynamically to incentivize the registered user to engage in scoring activities with respect to the service before expiration of a stocking deadline, the method performed by at least one processor, the method comprising:

causing, by the at least one processor, a display of a user score to be updated dynamically in one of a plurality of locations of a section of the graphical user interface, the user score representing a value of activity data that corresponds to the registered user of the service, wherein the user score is calculated dynamically in response to each detection of engagement by the registered user in one of the scoring activities with respect to the service, wherein two or more of the scoring activities are weighted differently in the calculating of the user score, wherein the scoring activities include two or more of uploading content to the service, creating content on the service, sending at least one message through the service, initiating at least one transaction through the service, interacting with at least one advertisement through the service, inviting at least one other user to register with the service, inviting at least one other user to register for the service who registers and becomes included in the top number or percentage of registered users, communicating with at least one other user through the service, subscribing to the service, interacting with at least one other user through the service, and using the service for at least one activity;

causing, by the at least one processor, a display of a leaderboard to be updated dynamically in an additional one of the plurality of locations of the section of the graphical user interface, the leaderboard including a ranking of a top number or percentage of registered users of the service, wherein the ranking is based on user scores representing values of activity data that correspond to the top number or percentage of the registered users of the service;

causing, by the at least one processor, a display of a threshold user score to be updated dynamically in the graphical user interface, the threshold user score identifying a current score needed for the registered user to qualify to receive the transfer of the value, the threshold user score calculated based on the user scores of the top number or percentage of users and a size of a pool of the top number or percentage of users, the size of the pool being adjustable; and based on a detecting, by the at least one processor, of a set of triggering events, the set of triggering events including determining that criteria for transferring a value to the registered user has been satisfied, the determining including identifying that the registered user was included in the top number or percentage of registered users at the expiration of the stocking deadline, performing a set of operations, the set of operations including causing a display of an indication in the graphical user interface indicating that the registered user is qualified to receive a transfer of the value.

2. The method of claim 1, the determining further including identifying that the registered user registered with the service prior to a registration deadline.

3. The method of claim 1, the determining further including identifying that the service reached a target parameter of registered users no later than the expiration of the stocking deadline.

4. The method of claim 1, wherein the value includes a grant of a share, a portion of a share, or a plurality of shares in the entity and an amount of the value is based on the user score.

5. The method of claim 1, wherein the user score is further calculated dynamically in response to each detection of engagement by the registered user in one of the scoring activities with respect to at least one other service.

6. A system comprising:

at least one processor; and a memory communicatively coupled to the at least one processor, the memory storing instructions that, when executed, cause the at least one processor to perform operations for causing a graphical user interface presented on a device of a registered user of a service to be updated dynamically to incentivize the registered user to engage in scoring activities with respect to the service before expiration of a stocking deadline, the operations comprising:

causing a display of a user score to be updated dynamically in one of a plurality of locations of a section of the graphical user interface, the user score representing a value of activity data that corresponds to the registered user of the service, wherein the user score is calculated dynamically in response to each detection of engagement by the registered user in one of the scoring activities with respect to the service, wherein two or more of the scoring activities are weighted differently in the calculating of the user score, wherein the scoring activities include two or more of uploading content to the service, creating content on the service, sending at least one message through the service, initiating at least one transaction through the service, interacting with at least one advertisement through the service, inviting at least one other user to register with the service, inviting at least one other user to register for the service who registers and becomes included in the top number or percentage of registered users, communicating with at least one other user through the service, subscribing to the service, interacting with at least one other user through the service, and using the service for at least one activity;

causing a display of a leaderboard to be updated dynamically in an additional one of the plurality of locations of the section of the graphical user interface, the leaderboard including a ranking of a top number or percentage of registered users of the service, wherein the ranking is based on user scores representing values of activity data that correspond to the top number or percentage of the registered users of the service;

causing, by the at least one processor, a display of a threshold user score to be updated dynamically in the graphical user interface, the threshold user score identifying a current score needed for the registered user to qualify to receive the transfer of the value, the threshold user score calculated based on the user scores of the top number or percentage of users and a size of a pool of the top number or percentage of users, the size of the pool being adjustable; and based on a detecting, by the at least one processor, of a set of triggering events, the set of triggering events including determining that criteria for transferring a value to the registered user has been satisfied, the determining including identifying that the registered user was included in the top number or percentage of registered users at the expiration of the stocking deadline, performing a set of operations, the set of operations including causing a display of an indication in the graphical user interface indicating that the registered user is qualified to receive a transfer of the value.

7. The system of claim 6, the determining further including identifying that the registered user registered with the service prior to a registration deadline.

8. The system of claim 6, the determining further including identifying that the service reached a target parameter of registered users no later than the expiration of the stocking deadline.

9. The system of claim 6, wherein the value includes a grant of a share, a portion of a share, or a plurality of shares in the entity and an amount of the value is based on the user score.

10. One or more non-transitory computer-readable storage media storing instructions which, when executed, cause at least one processor to perform operations for causing a graphical user interface presented on a device of a registered user of a service to be updated dynamically in to incentivize the registered user to engage in scoring activities with respect to the service before expiration of a stocking deadline, the operations comprising:

causing a display of a user score to be updated dynamically in one of a plurality of locations of a section of the graphical user interface, the user score representing a value of activity data that corresponds to the registered user of the service, wherein the user score is calculated dynamically in response to each detection of engagement by the registered user in one of the scoring activities with respect to the service, wherein two or more of the scoring activities are weighted differently in the calculating of the user score, wherein the scoring activities include two or more of uploading content to the service, creating content on the service, sending at least one message through the service, initiating at least one transaction through the service, interacting with at least one advertisement through the service, inviting at least one other user to register with the service, inviting at least one other user to register for the service who registers and becomes included in the top number or percentage of registered users, communicating with at least one other user through the service, subscribing to the service, interacting with at least one other user through the service, and using the service for at least one activity;

causing a display of a leaderboard to be updated dynamically in an additional one of the plurality of locations of the section of the graphical user interface, the leaderboard including a ranking of a top number or percentage of registered users of the service, wherein the ranking is based on user scores representing values of activity data that correspond to the top number or percentage of the registered users of the service;

causing, by the at least one processor, a display of a threshold user score to be updated dynamically in the graphical user interface, the threshold user score identifying a current score needed for the registered user to qualify to receive the transfer of the value, the threshold user score calculated based on the user scores of the top number or percentage of users and a size of a pool of the top number or percentage of users, the size of the pool being adjustable; and based on a detecting, by the at least one processor, of a set of triggering events, the set of triggering events including determining that criteria for transferring a value to the registered user has been satisfied, the determining including identifying that the registered user was included in the top number or percentage of registered users at the expiration of the stocking deadline, performing a set of operations, the set of operations including causing a display of an indication in the graphical user interface indicating that the registered user is qualified to receive the transfer of the value.

11. The method of 1, wherein the value is a single share, a plurality of shares, or a portion of a share in the entity.

12. The method of claim 1, wherein the user score is described as score data stored in a data storage device associated with the service.

13. The method of claim 3, wherein the identifying that the registered user registered with the service prior to the registration deadline is based on an analysis of registration data stored in a data storage device associated with the service.

14. The method of claim 3, wherein the identifying that the service reached the target parameter of registered users no later than the expiration of the stocking deadline is based on an analysis of registration data stored in a data storage device associated with the service.

15. The method of claim 1, wherein the weightings are specified by the entity associated with the service based on a quantifiable measure and the operations further include notifying the registered user of the weightings to more heavily incentivize the registered user to engage one of the at least two scoring activities than others.

16. The method of claim 1, wherein the top number or percentage of registered users are included in a set of designated users, the set of designated users being a subset of registered users of the service who have qualified to receive additional transfers of value.

17. The method of claim 3, the determining further including identifying that the registered user registered with the service prior to the service reaching the target parameter of registered users.

18. The method of claim 1, further comprising sending, by the at least one processor, a network communication to initiate the transfer of the value to the registered user.

19. The method of claim 1, wherein the determining includes identifying that the registered user is not a bot or a fraudster, the identifying that the registered user is not a bot or a fraudster including vetting the registered user based on attributes of the registered user or a credential of the registered user.

* * * * *